United States Patent
Wakamatsu

(10) Patent No.: US 6,910,983 B2
(45) Date of Patent: Jun. 28, 2005

(54) POWER TRANSFER APPARATUS OF FOUR-WHEEL DRIVE VEHICLE AND DEVICE FOR CONTROLLING TORQUE

(75) Inventor: Masanari Wakamatsu, Tochigi-ken (JP)

(73) Assignee: Tochigi Fuji Sangyo Kabushiki Kaisha (JP)

( * ) Notice: Subject to any disclaimer, the term of this patent is extended or adjusted under 35 U.S.C. 154(b) by 0 days.

(21) Appl. No.: 10/681,794

(22) Filed: Oct. 8, 2003

(65) Prior Publication Data

US 2004/0116247 A1 Jun. 17, 2004

(30) Foreign Application Priority Data

Oct. 8, 2002 (JP) ................................... P.2002-295259

(51) Int. Cl.[7] .............................................. B60K 41/22
(52) U.S. Cl. ..................................... 475/199; 192/3.63
(58) Field of Search ........................ 475/199; 192/3.63, 192/3.56

(56) References Cited

U.S. PATENT DOCUMENTS

| | | | | |
|---|---|---|---|---|
| 4,674,610 A | * | 6/1987 | Sakakiyama | 192/3.56 |
| 4,711,333 A | * | 12/1987 | Okamura | 477/176 |
| 4,715,467 A | * | 12/1987 | Sakai | 477/36 |
| 4,718,303 A | * | 1/1988 | Fogelberg | 475/150 |
| 4,909,345 A | * | 3/1990 | Iwatsuki et al. | 180/250 |
| 5,564,518 A | * | 10/1996 | Ishii et al. | 192/3.63 |
| 5,875,865 A | * | 3/1999 | Wakahara et al. | 180/248 |
| 6,722,482 B2 | * | 4/2004 | Takuno et al. | 192/35 |

FOREIGN PATENT DOCUMENTS

JP      P2000-234633 A      8/2000      ......... F16D/27/112

* cited by examiner

*Primary Examiner*—Sherry Estremsky
(74) *Attorney, Agent, or Firm*—Osha & May L.L.P.

(57) ABSTRACT

A power transfer apparatus 1 of a four-wheel drive vehicle includes, a clutch, an inversion detector, and controller. The clutch generates an engagement force that effects a driving force output from an engine to wheels of the vehicle via a transmission. The transmission includes the inversion detector 23, 27 for detecting inversion or non-inversion of a gear-shifting direction of the transmission 13. The controller 23 subjects the electromagnet to energization control such that torque to be transmitted by the clutch is decreased to a target value in accordance with an inversion signal pertaining to said gear-shifting direction detected by said inversion detector 23, 27.

14 Claims, 12 Drawing Sheets

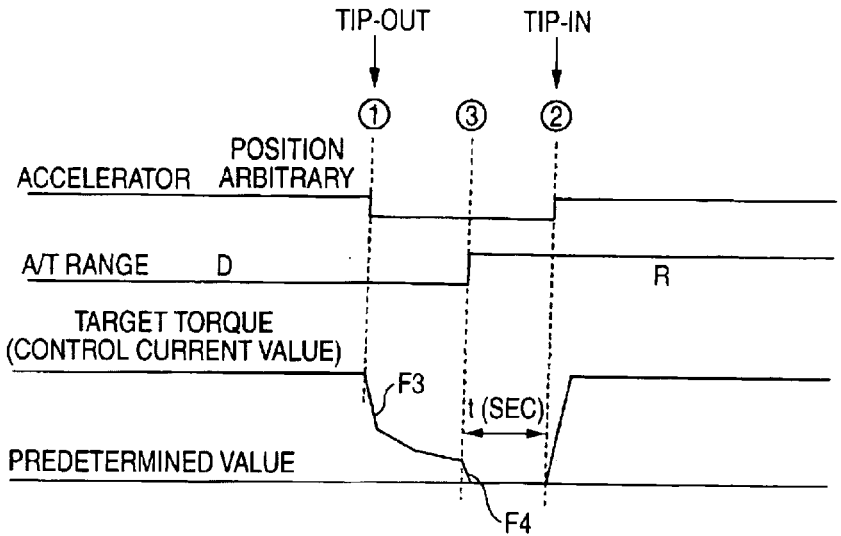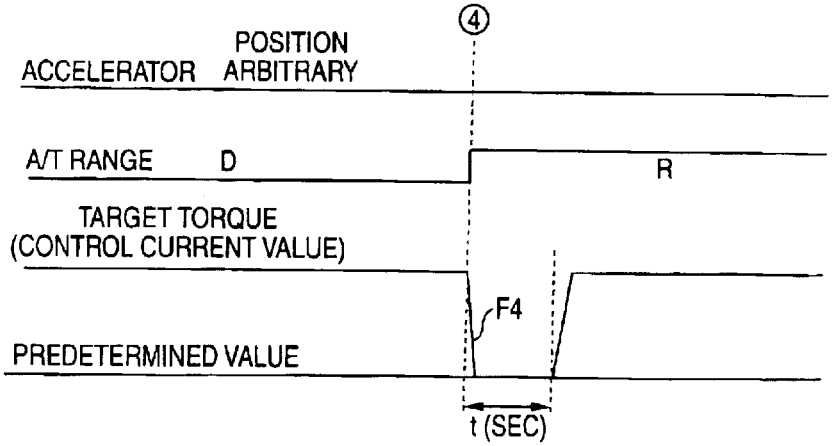

FIG. 5A

| RANGE |
|---|
| P |
| R |
| N |
| D (1ST-X) |

FIG. 5B

| RANGE (THIS TIME) | DIRECTION OF A/T RANGE (THIS TIME) |
|---|---|
| P | RETAINED (DIRECTION OF PREVIOUS RANGE) |
| R | 0 |
| N | RETAINED (DIRECTION OF PREVIOUS RANGE) |
| D | 1 |

FIG. 5C

| DIRECTION OF PREVIOUS A/T RANGE XOR DIRECTION OF A/T RANGE OBTAINED THIS TIME | INVERSION OF A/T RANGE |
|---|---|
| 0 | NON-INVERTED |
| 1 | INVERTED |

XOR: EXCLUSIVE OR RESULT

FIG. 6

| DETERMINATION OF INVERSION OF RANGE | TARGET TORQUE | TARGET TORQUE RETENTION TIME | LIMITATION ON REDUCTION OF TARGET TORQUE |
|---|---|---|---|
| INVERTED | T (EMPLOYED IN THE FORM OF CONSTANT) | t (EMPLOYED IN THE FORM OF CONSTANT) | REDUCTION METHOD B (LINE SEGMENT F4) |
| NON-INVERTED | CONVENTIONAL VALUE | 0 NON-RETENTION | REDUCTION METHOD A (LINE SEGMENT F3) |

| TARGET TORQUE | LIMITATION ON REDUCTION OF TARGET TORQUE |
|---|---|
| T2 < TARGET TORQUE | L3 |
| T1 < TARGET TORQUE ≤ T2 | L2 |
| TARGET TORQUE ≤ T1 | L1 |

FIG. 9A

| RANGE |
|---|
| N |
| R |
| 1ST-X |

FIG. 9B

| RANGE (THIS TIME) | DIRECTION OF M/T RANGE (THIS TIME) |
|---|---|
| R | 1 |
| N | RETAINED (DIRECTION OF PREVIOUS RANGE). |
| 1ST-X | 0 |

FIG. 9C

| DIRECTION OF PREVIOUS M/T RANGE XOR DIRECTION OF M/T RANGE OBTAINED THIS TIME | INVERSION OF M/T RANGE |
|---|---|
| 0 | NON-INVERTED |
| 1 | INVERTED |

XOR: EXCLUSIVE OR RESULT

PRIOR ART

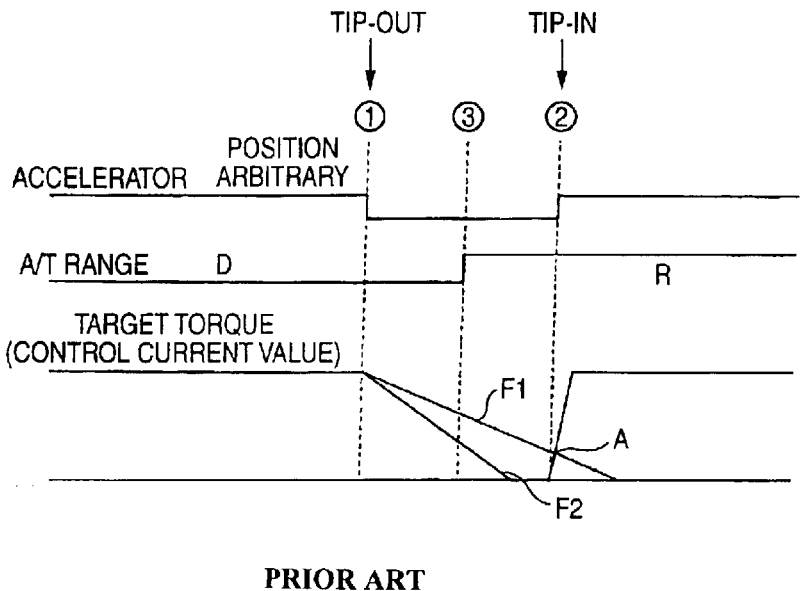
PRIOR ART
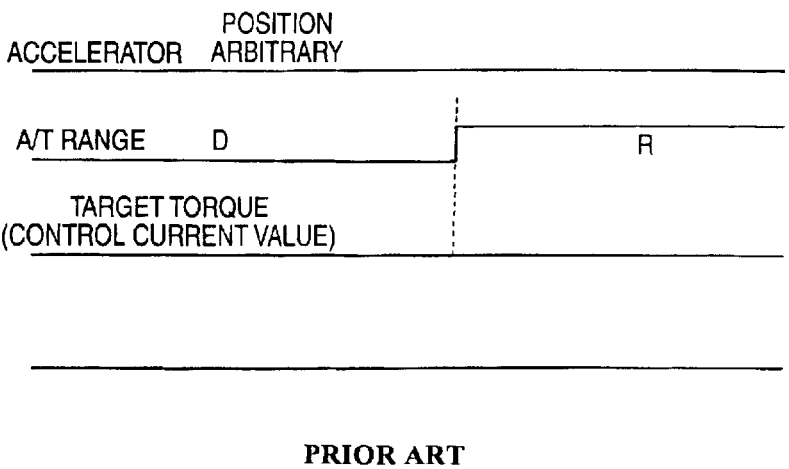
PRIOR ART

POWER TRANSFER APPARATUS OF FOUR-WHEEL DRIVE VEHICLE AND DEVICE FOR CONTROLLING TORQUE

BACKGROUND OF THE INVENTION

The present invention relates to an automobile power transfer apparatus for transferring to driving wheels power which is output from an engine, by way of a transmission. Further, the present invention also relates to a device for controlling torque to be transmitted to a clutch.

A power transfer apparatus such as that shown in, e.g., FIGS. 12 and 13, has hitherto been available as a power transfer apparatus of this type. FIG. 12 is a skeleton plan view of a four-wheel drive vehicle; and FIG. 13 is a semi-cross-sectional view of a power transfer apparatus. As shown in FIG. 12, the power transfer apparatus 103 is interposed between drive shafts 105, 107 in the four-wheel drive vehicle 101.

Driving force output from an engine 109 by way of a transmission and a transfer 111 is transmitted to rear wheels 117 by way of the drive shaft 105, the power transfer apparatus 103, the drive shaft 107, a rear differential 113, and an axle shaft 115. Meanwhile, the driving force is also transmitted to front wheels 123 by way of a front differential 119 and an axle shaft 121.

The power transfer apparatus 103 has such a structure as shown in FIG. 13. Specifically, a main clutch 129 serving as clutch means, a pilot clutch 131, and a cam mechanism 123 serving as conversion means are interposed between an inner rotary member 125 and an outer rotary member 127. The power transfer apparatus 103 has an electromagnet 135. The outer rotary member 127 is joined to the drive shaft 105 (see FIG. 12), and the inner rotary member 125 is joined to the other drive shaft 107 (see FIG. 12).

When the pilot clutch 131 is engaged by means of electromagnetic force derived from energization control of the electromagnet 135, the cam mechanism 123 is actuated, thereby rendering the main clutch 129 engaged. Consequently, the driving force transmitted to the drive shaft 105 is transmitted to the outer rotary member 127, and torque is transferred to the internal rotary member 125 by way of the main clutch 129, whereupon the driving force is transferred to the other drive shaft 107.

In this way, the four-wheel drive vehicle 101 shown in FIG. 12 enables transmission, to the rear wheels 117, of the driving force output from the engine 109 by way of the transmission and the transfer 111, by means of fastening force control embodied by energization control of the power transfer apparatus 103 disposed on and between the drive shafts 105, 107 (refer to, e.g., Japanese Patent Unexamined Publication No. 2000-234633, particularly, pages 2 to 4 and FIGS. 1 and 3 thereof.)

The energization control of the electromagnet 135 of the power transfer apparatus 103 is performed in accordance with an accelerator position or a throttle position of the automobile. FIGS. 14 and 15 are timing charts showing variations in target values of torque to be transmitted by the power transfer apparatus 103 (hereinafter referred to as "transmission torque") in terms of an accelerator position or a throttle position and an A/T (automatic transmission) range. FIGS. 14 and 15 show conditions of the vehicle when switching is made from a forward traveling state to a rearward traveling state. FIG. 15 shows a state in which the four-wheel drive vehicle remains stationary by means of so-called tight corner braking phenomenon. FIGS. 14A and 15A show variations in accelerator position or throttle position, FIGS. 14B and 15B show a change in the A/T range; and FIGS. 14C and 15C show variations in target torque (control current value).

First, the four-wheel drive vehicle shown in FIG. 12 is taking corners under the stipulation that a tight corner braking phenomenon will arise. A friction factor $\mu$ existing between tires and the road surface is high. Further, the gear position of the transmission; that is, an A/T range of an automatic transmission in this example, is, for example, a drive range D. The accelerator or throttle position is in an arbitrary open position.

In such a traveling state, when the A/T range is switched from the drive range D to a reverse range R at a point in time (3) shown in FIG. 14, the accelerator or throttle position is actuated from an arbitrary open position to an arbitrary closed position at a point in time (1) (tip-out) and actuated from an arbitrary close position to an arbitrary open position at a point in time (2) (tip-in). Switching between the tip-out and the tip-in is effected within an extremely short period of time.

After the tip-out (1) has arisen, the target torque (i.e., a target value of transmission torque) of the power transfer apparatus 103 is transmitted along a line segment F1 at, e.g., a given slope. For instance, energization of the electromagnet 135 is controlled such that the target torque decreases to, e.g., transmission torque of 0 Nm.

However, when energization control is performed along such a line segment F1, the transmission torque of the power transfer apparatus 103 fails to reach a predetermined level during a duration from the tip-out (1) to the tip-in (2), the duration being an extremely short period of time. The control current again increases from a point A so as to attain the target torque corresponding to an arbitrary accelerator or throttle position.

When the gear-shifting direction of the transmission is inverted during the period existing between the tip-out (1) and the tip-in (2); for example, when switching is made from a drive position (driving forward) to a reverse position (driving backwards), with the transmission torque still remaining in the power transfer apparatus 103 in the manner as mentioned previously, there arises a problem of occurrence of an unusual noise in the power transfer apparatus 103, the transfer 111, the rear differential 113, or the front differential 119.

Specifically, when the gearing direction of the automatic transmission is inverted as a result of the automatic transmission having been switched from the drive position to the reverse position with the transmission torque still being ensured in the power transfer apparatus 103, the direction of torsion of the drive shafts 105, 107 of the drive system existing between the front and rear wheels 123, 117 is changed by means of the tight corner braking phenomenon under the foregoing driving conditions. If a change arises in the direction—in which backlash is eliminated along the axis of the power transfer apparatus 103—or the torque (force)—which would arise at the time of elimination of backlash—exceeds a predetermined level because of a change in the direction of torsion, there will arise a problem of occurrence of a collision sound grating on the occupants' ears or physical shock that the occupants find offensive.

Such collision sound or physical shock is induced by means of controlling the target torque of the power transfer apparatus 103 along the line segment F1 having a gentle slope. If the target torque is controlled along, e.g., a line segment F2 having a steep slope, the power transfer apparatus 103 can achieve a predetermined value of transmission torque before the tip-out (2). Therefore, in this case, even if a change has arisen in the direction of torsion in the drive shafts 105, 107, unusual noise which would grate on the occupants' ears will not arise as compared with the case where the transmission torque still remains in the power transfer apparatus 103.

In contrast, if the target torque of the power transfer apparatus 103 is controlled along the line segment F2 having a steep slope, vibration will arise in the vicinity of a range in which the transmission torque of the power transfer apparatus 103 assumes a value of 0 Nm. Hence, there arises a problem of the vibration being transmitted to occupants as physical shock, such as swaying motion.

According to the traveling condition illustrated in FIG. 15, the vehicle is taking corners under the stipulation that a tight corner braking phenomenon will arise, with the accelerator or throttle position being set in an arbitrary open position. The friction factor $\mu$ existing between tires and the road surface is high. Further, there will arise a situation in which the vehicle comes to a halt while taking corners by means of the tight corner braking phenomenon. In such a situation where the vehicle remains stationary, the A/T range of the automatic transmission can be considered to be switched from the drive range D to the reverse range R; i.e., inversion of the gear-shifting direction can arise. At this time, the target torque of the power transfer apparatus 103 is presumed to be set to an accelerator or throttle position required to make such a setting that the target torque exceeds an allowable level at which no unusual noise arises.

Accordingly, inversion of the gear-shifting direction arises in the same situation in which the transmission torque exists in the power transfer apparatus 103, in the same manner as described in connection with FIG. 14. The direction of torsion of the drive shafts 105, 107 is changed by the tight corner braking phenomenon in the same manner as mentioned above. Similarly, the torque developing at the time of inversion of the direction in which backlash is eliminated exceeds the allowable level at which no unusual noise arises, and hence there will arise a problem of occurrence of unusual noise (a collision sound) grating on the occupants' ears that the occupants find offensive.

The descriptions have described inversion of the gear-shifting direction by reference to the operation for switching the drive range D to the reverse range R. The inversion of gear-shifting direction arises in the same manner even by means of an operation for switching the reverse range R to the drive range D, thereby involving occurrence of unusual noise in the same manner.

In relation to the traveling state of the vehicle (i.e., a transmission state of driving force to the vehicle) and the gear-shifting state of the transmission, such as a request for high torque at a low speed of the vehicle or a request for low torque at a high speed of the vehicle, driving stability must be improved.

SUMMARY OF THE PRESENT INVENTION

It is a first object of the present invention to inhibit occurrence of unusual sound by paying attention to unusual sound which arises in accordance with inversion of the gear-shifting direction of a transmission. In addition to this, it is a second object of the present invention to inhibit occurrence of unusual sound by reducing physical shock which would arise at the time of a tip-out. Further, it is also an object of the present invention to appropriately transmit to a vehicle transmission driving force, which is produced in a driving state including a halt and start of the vehicle, thereby improving driving stability.

The above-mentioned object can be achieved by a power transfer apparatus of a four-wheel drive vehicle according to a first aspect of the present invention. The power transfer apparatus is disposed between front and rear wheels and 1) is capable of transmitting, to the wheels, driving force output from an engine through a transmission in accordance with an engagement force of a clutch member while the engagement force of clutch member is controlled, or 2) is capable of transmitting, to the wheels, driving force output from an engine through a transmission, while a differential motion of a differential disposed between the front and rear wheels is limited by controlling an engagement force of a clutch members. (In other words, the power transfer apparatus is disposed between primary and secondary wheels, and has 1) a clutch member being capable of distributing a torque (i.e, a driving force), that is generated by an engine via a transmission, between the primary wheel to the secondary wheel directly, or 2) a clutch member and a differential being capable of distributing a torque, that is generated by an engine via a transmission, between the primary wheel to the secondary wheel while a differential motion of the differential disposed between the primary wheel and the secondary wheel is limited by controlling an engagement force of the clutch member.)

The transmission comprises:

inversion detection member for detecting inversion or non-inversion of a gear-shifting direction of the transmission; and control member for effecting control operation such that torque to be transmitted by the clutch members is decreased to a target value in accordance with an inversion signal pertaining to the gear-shifting direction detected by the inversion detection member.

In the above-mentioned power transfer apparatus of a four-wheel drive vehicle, according to a second aspect of the present invention, it is preferable that the control member performs control operation by setting a target control value corresponding to the target value of the torque to be transmitted, thereby maintaining the target control value for a given period of time.

In the above-mentioned power transfer apparatus of a four-wheel drive vehicle, according to a third aspect of the present invention, it is more preferable to, further comprise: accelerator or throttle position detection member for detecting whether the accelerator or throttle position is in an arbitrary open position or an arbitrary closed position, wherein, when an inversion signal detected by the inversion detection member arises during the course of the accelerator or throttle position detected by the accelerator or throttle position detection member shifting again to an open position after having shifted from an arbitrary open position to an arbitrary closed position, the control member sets the given period of time on the basis of the inversion signal before the accelerator or throttle position again shifts to the open position.

In the above-mentioned power transfer apparatus of a four-wheel drive vehicle, according to a fourth aspect of the present invention, it is advantageous that, when an inversion signal detected by the inversion detection member arises during the course of the accelerator or throttle position detected by the accelerator or throttle position detection member shifting again to an open position after having shifted from an arbitrary open position to an arbitrary closed position and when shifting of the accelerator or throttle position from an arbitrary open position to an arbitrary closed position has been detected, the control member performs control operation for reducing the torque to be transmitted by the clutch member and making a decrease rate steep at the beginning and then gentle before the inversion signal detected by the inversion detection member arises.

In the above-mentioned power transfer apparatus of a four-wheel drive vehicle, according to a fifth aspect of the present invention, it is further advantageous that the control member makes equivalent to a time constant the decrease rate of the torque to be transmitted.

Moreover, in the above-mentioned power transfer apparatus of a four-wheel drive vehicle, according to a sixth aspect of the present invention, it is preferable that the clutch member comprises a main clutch which is interposed between inner and outer rotary members, which enables transmission of torque by generating frictional engagement force when the inner and outer rotary members rotate in relation to each other, and which increases or decreases the frictional engagement force in accordance with axial pressing force; a pilot clutch which performs frictional engagement by member of electromagnetic force generated through the energization control; and conversion member which operates by member of frictional engagement of the pilot clutch, which converts force derived from frictional engagement of the pilot clutch, and which imparts pressing force to the main clutch.

Further, the above-mentioned object can also be attained by a power transfer apparatus of a four-wheel drive vehicle according to a second aspect of the present invention. The power transfer apparatus is disposed between front and rear wheels and 1) is capable of transmitting, to the wheels, driving force output from an engine through a transmission in accordance with an engagement force of a clutch member while the engagement force of a clutch member may be controlled by the electromagnetic force derived from energization control, or 2) is capable of transmitting, to the wheels, driving force output from an engine through a transmission, while a differential motion of a differential disposed between the front and rear wheels is limited by controlling an engagement force of a clutch member. (In other words, the power transfer apparatus is disposed between primary and secondary wheels and has 1) a clutch member being capable of distributing a torque (i.e, a driving force), that is generated by an engine via a transmission, between the primary wheel to the secondary wheel directly, or 2) a clutch member and a differential being capable of distributing a torque, that is generated by an engine via a transmission, between the primary wheel to the secondary wheel while a differential motion of the differential disposed between the primary wheel and the secondary wheel is limited by controlling an engagement force of the clutch member.)

The power transfer apparatus comprises: gear shift status detection member for detecting the state of gear shift of the transmission; and control member for subjecting an electromagnet to energization control such that the torque to be transmitted by the clutch member attains a target value in accordance with a gear shift status signal detected by the gear shift status detection member.

In the above-mentioned power transfer apparatus, it is advantageous that the torque is transmitted in accordance with an engagement force of the clutch while an engagement force of the clutch is controlled by an electromagnetic force derived from energization control.

Further, in the above-mentioned power transfer apparatus, it is also advantageous that the torque is transmitted while a differential motion of a differential disposed between the primary wheel and the secondary wheel is limited by controlling an engagement force of the clutch that is controlled by the electromagnetic force derived from energization control.

Note that for example, the energization control can be conducted by controlling a current level or an amplitude of the clutch.

Further, note that although the clutch is controlled by the electromagnetic force derived from energization control in the above-mentioned aspects, it is possible to modify it in such a manner that the clutch can be controlled hydraulically.

According to the first aspect of the invention, the engagement force of the clutch member disposed between the front and rear wheels is controlled, and the driving force output from the engine by way of the transmission can be transmitted to the wheels while a limitation is imposed on the difference in movement between the front and rear wheels according to or by member of the engagement force. Further, the inversion detection member detects occurrence of inversion or non-inversion of gear-shifting direction of the transmission. In accordance with a signal pertaining to inversion of the gear-shifting direction detected by the inversion detection member, the control member can perform control operation so as to decrease to a target value the torque to be transmitted by the clutch member (transmission torque).

Therefore, given that the clutch member possesses engagement force while the accelerator or throttle position is held in an arbitrary position and that the position is held in an arbitrary position and that the four-wheel drive vehicle is taking corners, if the gear-shifting direction of the transmission is switched from a forward driving direction to a rearward driving direction or from a rearward driving direction to a forward driving direction while the accelerator or throttle position is being shifted from an arbitrary open position to an arbitrary closed position and again to the open position or while the four-wheel drive vehicle remains stationary because of so-called tight corner braking phenomenon, the torque transmitted by the clutch member is decreased to a target value, e.g., 0 Nm, by member of the inversion signal. As a result, the transmission torque of the clutch member of the power transfer apparatus no longer remains or becomes nominal. Therefore, even when the direction of distortion of the drive system is changed by member of the tight corner braking phenomenon, to thereby change the direction in which backlash is to be eliminated along the axis of the power transfer apparatus, torque (force) resulting from elimination of backlash falls within an allowable value in which no unusual noise arises. Hence, occurrence of collision sound, which would grate on the occupants' ears, is avoided, and occurrence of unusual noise can be inhibited.

In addition to yielding the effect yielded by the first aspect of the invention, the second aspect of the invention enables the control member to perform control operation by member of setting a target control value corresponding to the target value of the transmission torque, to thus maintain the target control value for a given period of time. Accordingly, when control is performed in accordance with the target control value, the transmission torque of the clutch member can be reduced to the target value without fail even if a lag has arisen in the response of the clutch member. Hence, occurrence of unusual noise can be inhibited reliably.

In addition to yielding the effect yielded by the second aspect of the present invention, the third aspect of the invention enables the accelerator or throttle position detection member to detect whether the accelerator or throttle is in an arbitrary open position or an arbitrary closed position. When an inversion signal to be detected by the inversion detection member arises during the course of the accelerator or throttle position to be detected by the accelerator or throttle position detection member being shift from an arbitrary open position to an arbitrary closed position and again to the open position, the control member can set the given period of time on the basis of the inversion signal before the accelerator or throttle position shifts again to the open position.

Therefore, when the clutch member of the power transfer apparatus has achieved the target transmission torque with the accelerator or throttle position being in an arbitrary open position and when the vehicle is in a four-wheel drive state and taking corners, the transmission is switched from a drive range to a reverse range during a period between a tip-out and a tip-in of the accelerator or throttle position. When the gear-shifting direction is reversed, the transmission torque of the clutch member can be reduced to the target value without fail during a period starting from occurrence of the inverse signal and ending in occurrence of the tip-out. As a result, collision sound or physical shock, which grates on or becomes offensive to the vehicle's occupants and would otherwise arise at the time of occurrence of a tip-out, is prevented, thereby inhibiting generation of unusual noise or occurrence of physical shock.

In addition to yielding the effect yielded by the the third aspect of the invention, the fourth aspect of the invention enables the control member to perform control operation such that the transmission torque of the clutch member is reduced before the inverse signal to be detected by the inversion detection member arises and such that a decrease rate is made steep at the beginning and then gentle when an inversion signal detected by the inversion detection member arises during the course of the accelerator or throttle position detected by the accelerator or throttle position detection member shifting again to an open position after having shifted from an arbitrary open position to an arbitrary closed position and when the accelerator or throttle position has shifted from an arbitrary open position to an arbitrary closed position.

The control operation to be performed from when the tip-out has arisen until when the inverse signal has arisen can be made different from that to be performed from when the inverse signal has arisen until when the tip-in has arisen. Therefore, during a period from when the tip-out has arisen until when the inverse signal has arisen, there can be inhibited occurrence of physical shock, which would otherwise cause the vehicle body to vibrate because of a sharp drop in the control value to the target torque. Concurrently, the time required to diminish the transmission torque can be shortened. During a period from when the inverse signal has arisen until when the tip-in has arisen, the control value is rapidly decreased so as to assume the target torque. The transmission torque of the clutch member is set to the target value without fail at the time of tip-out. Even when a change has arisen in the direction in which backlash is to be eliminated along the axis of the power transfer apparatus, for reasons of a change in the direction of torsion of the drive system due to the tight corner braking phenomenon, the torque (force) derived from elimination of backlash falls within an allowable value in which no unusual noise arises. Hence, there is inhibited occurrence of collision sound or vibration, which would otherwise grate on or become offensive to the occupants, thereby reliably preventing occurrence of unusual noise or physical shock.

In addition to yielding the effect yielded by the invention of the fourth aspect of the present invention, the fifth aspect of the invention enables the control member to make equivalent to a time constant the decrease rate of the torque to be transmitted. Therefore, an amplitude can be reduced in terms of vibrational response. Physical shock such as fluctuations in the vehicle body can be dampened more reliably.

In addition to yielding the effect yielded by the invention of any one of The first to fifth aspect of the present invention, the sixth aspect of the invention enables the clutch member to comprise: a main clutch which is interposed between inner and outer rotary members, which enables transmission of torque by generating frictional engagement force when the inner and outer rotary members rotate in relation to each other, and which increases or decreases the frictional engagement force in accordance with axial pressing force; a pilot clutch which performs frictional engagement by member of electromagnetic force generated through the energization control; and conversion member which operates by member of frictional engagement of the pilot clutch, which converts force derived from frictional engagement of the pilot clutch, and which imparts pressing force to the main clutch. When the pilot clutch is subjected to frictional engagement by member of the electromagnetic force due to energization control according to the accelerator or throttle position, the conversion member converts the frictional engagement force, to thereby impart pressing force to the main clutch. In accordance with the pressing force, the main clutch can increase or decrease the frictional engagement force. By member of the main clutch, the frictional engagement force is produced when the inner and outer rotary members rotate in relation to each other, thereby enabling transmission of torque between the inner and outer rotary members.

Accordingly, the engagement force of the main clutch is controlled at a position between the front and rear wheels of the four-wheel drive vehicle, by member of the electromagnetic force due to energization control corresponding to the accelerator or throttle position. The driving force output from the engine by way of the transmission can be transmitted to the wheels while a limitation is imposed on the differential motion of the differential interposed between the front and rear wheels, in accordance with or by member of the engagement force. Occurrence of unusual noise can be inhibited during such an operation, or vibration or physical shock, such as swinging of the vehicle body, can be dampened.

A seventh aspect of the present invention provides a power transfer apparatus of a four-wheel drive vehicle which is disposed between front and rear wheels and is capable of transmitting, to the wheels, driving force output from an engine by way of a transmission according to the engagement force by member of controlling engagement force of clutch member by the electromagnetic force derived from energization control, the power transfer apparatus comprising: gear shift status detection member for detecting the state of gear shift of the transmission; and control member for subjecting an electromagnet to energization control such that the torque to be transmitted by the clutch member is set to a target value in accordance with a gear shift status signal detected by the gear shift status detection member. Hence, the driving force to be transmitted from the engine to the vehicle can be controlled optimally by controlling the clutch member in accordance with the gear shift state of the transmission. For instance, the advantages yielded by the first to sixth aspect of the present invention can also be yielded. For instance, the electromagnet can be subjected to energization control such that the transmission torque shifts to the target value, in accordance with a signal pertaining to the statuses of gear positions which are employed as substitutes for the gear positions of a manual transmission or those of an automatic transmission. As a result, the transmission torque can be controlled immediately under various situations; for example, where high drive torque is required while a vehicle remains at a low-speed state; where transmission torque higher than required is not needed for the vehicle to cruise at high speed; and where supply of transmission torque to four wheels is not required when the gear is shifted to a low-speed range (to prevent occurrence of interference with an ABS), by member of increasing or decreasing the transmission torque required to achieve driving stability according to the gear position when the vehicle is taking corners.

Moreover, the above-mentioned object can also be achieved by a power transfer apparatus of a four-wheel drive vehicle, according to the another aspect of the present invention that comprises:

a clutch that distributes a torque, that is generated by an engine via a transmission, between a primary wheel to a secondary wheel;

means for detecting a gear shifting condition of the transmission; and a controller that receives an input signal indicating the gear shifting condition and generates a control signal that reduces a torque transmitted by the clutch to a target value.

In addition, the above-mentioned object can also be attained by a device for controlling torque transmitted by a clutch, according to the further another aspect of the present invention that comprises:

a controller that generates a control signal based on an input received from a transmission, wherein the control signal is output to the clutch to decrease the torque to a target value.

BRIEF DESCRIPTION OF THE DRAWINGS

FIG. 3 relates to the embodiment, wherein FIG. 3A is a graph showing a change in an accelerator or throttle position; FIG. 3B is a graph showing a change in the A/T range; and FIG. 3C is a graph showing a change in target torque;

FIG. 4 relates to the embodiment, wherein FIG. 4A is a graph showing a change in an accelerator or throttle position; FIG. 4B is a graph showing a change in the A/T range; and FIG. 4C is a graph showing a change in target torque;

FIG. 5 relates to the embodiment, wherein FIG. 5A is a table showing symbols used for ascertaining an A/T range; FIG. 5B is a table showing perception of direction of the A/T range; and FIG. 5C is a table-for showing perception of inversion of the A/T range;

FIG. 6 relates to the embodiment, showing a table of operation settings employed when a determination is made as to whether or not the A/T range is inverted;

FIG. 7 relates to the embodiment, wherein

FIG. 9 shows an embodiment to which a manual transmission is applied, wherein FIG. 9A is a table showing signals employed for perceiving an M/T range, FIG. 9B is a table pertaining to perception of the direction of the M/T range, and FIG. 9C is a table showing perception of inversion of the M/T range;

FIG. 14 describes drawbacks of the related art, wherein FIG. 14A is a graph showing a change in accelerator or throttle position, FIG. 14B is a graph showing a change in the A/T range, and FIG. 14C is a graph showing a change in target torque; and FIG. 15 describes drawbacks of the related art, wherein FIG. 15A is a graph showing a change in accelerator or throttle position, FIG. 15B is a graph showing a change in the A/T range, and FIG. 15C is a graph showing a change in target torque.

DETAILED DESCRIPTION OF THE PREFERRED EMBODIMENTS

Figure 1:
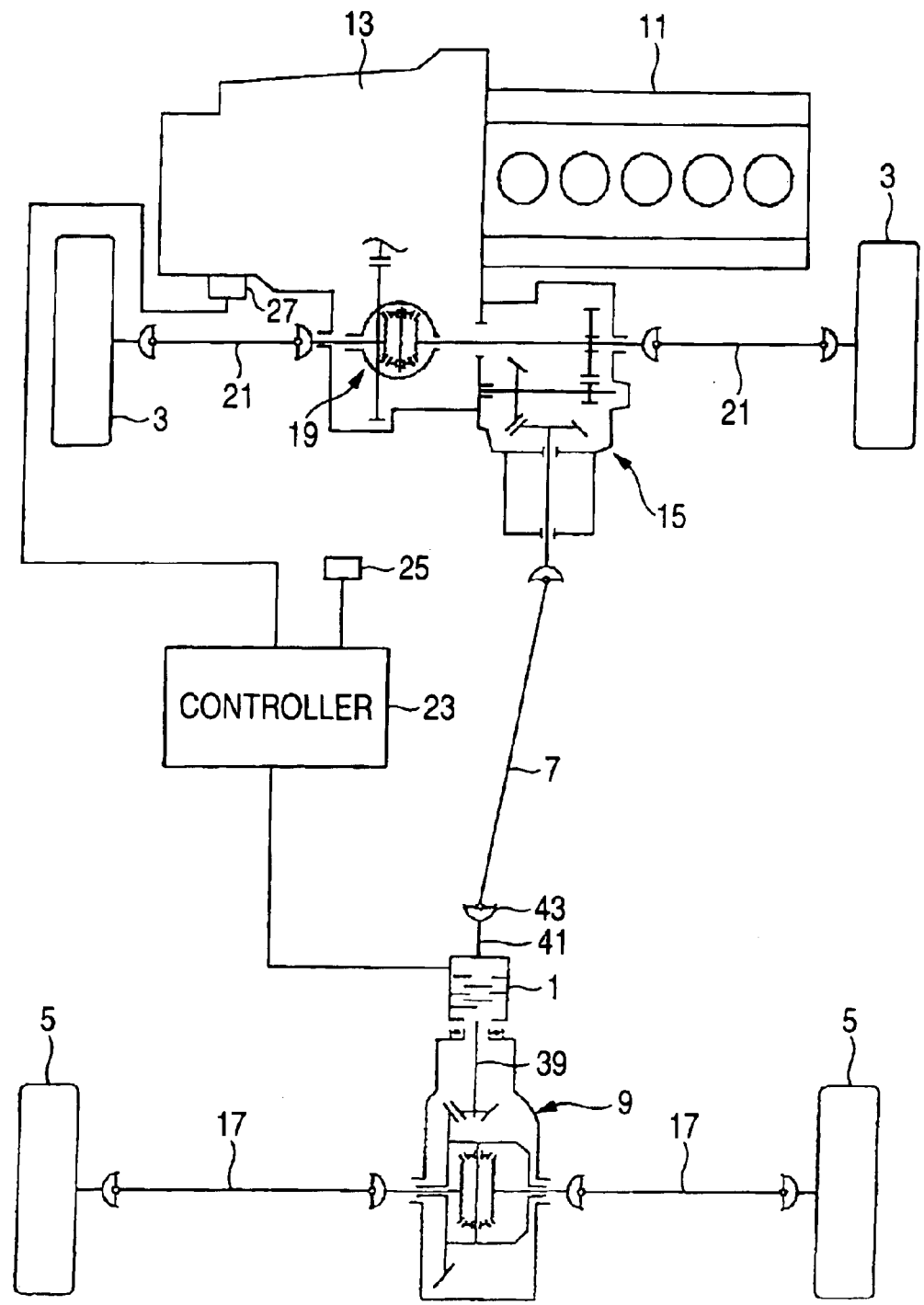
FIG. 1 is a skeleton plan view of a four-wheel drive vehicle according to an embodiment of the invention.
Figure 2:
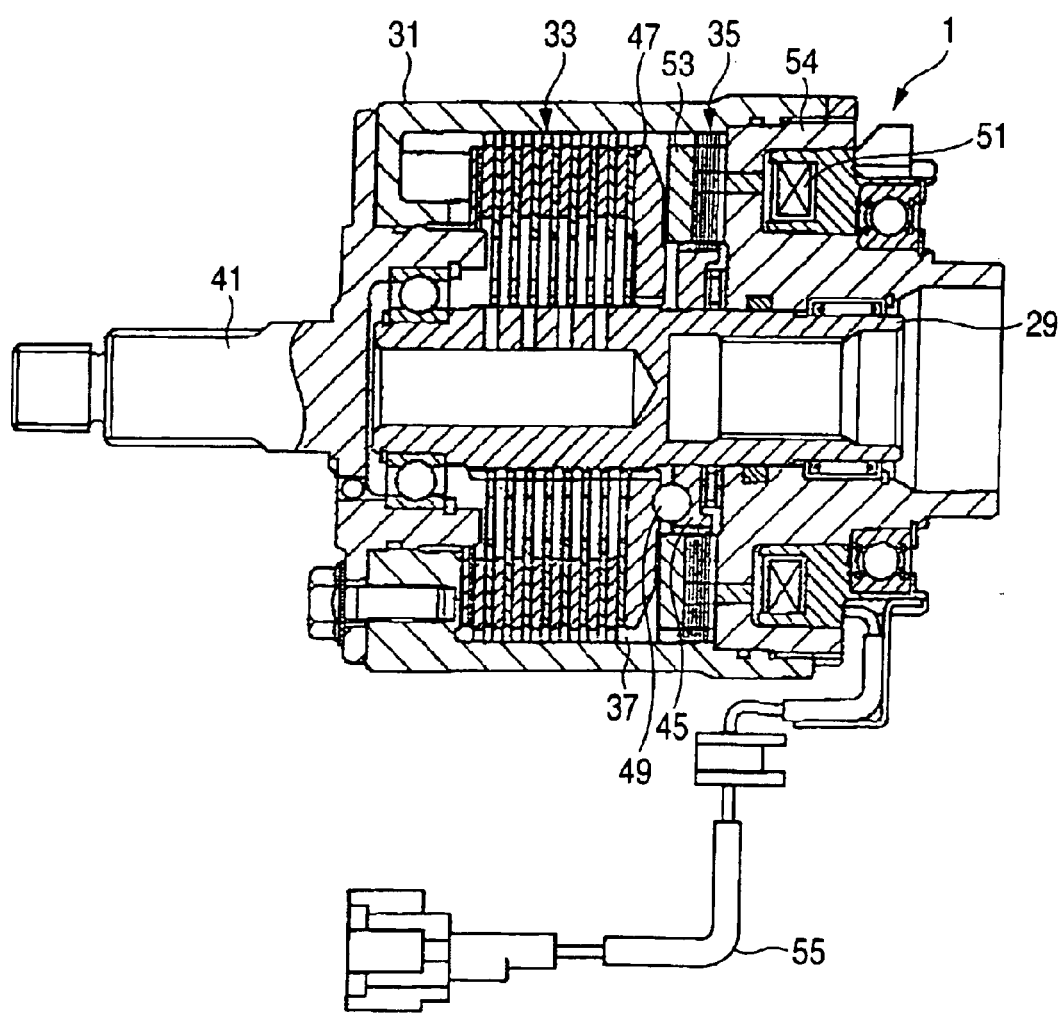
FIG. 2 is a cross-sectional view of a control coupling according to the embodiment.

FIGS. 1 and 2 relate to an embodiment of the present invention. FIG. 1 is a skeleton plan view of a four-wheel drive vehicle, and FIG. 2 is a cross-sectional view of a power transfer apparatus. The four-wheel drive vehicle shown in FIG. 1 is based on a front-engine and front-wheel (FF) configuration. A control coupling 1 serving as a power transfer apparatus is provided in a drive system disposed between front wheels 3 and rear wheels 5. In the embodiment, the control coupling 1 is interposed between a drive shaft 7 and a rear differential 9.

Driving force is transmitted from an engine 11 to the drive shaft 7 by way of an automatic transmission 13 serving as a transmission, and a transfer 15. The driving force is further transmitted to the rear wheels 5 from the drive shaft 7 by way of the control coupling 1, the rear differential 9, and an axle shaft 17. The driving force is further transmitted from the engine 11 to the front wheels 3 by way of the automatic transmission 13, the transfer 15, a front differential 19, and an axle shaft 21.

The control coupling 1 is controlled by a controller 23 serving as control means, by means of electromagnetic force derived from energization control corresponding to the accelerator or throttle position, thereby transmitting the driving force. The accelerator or throttle position is detected by means of an accelerator pedal position sensor 25. A detection signal output from the accelerator pedal position sensor 25 is delivered to the controller 23.

The automatic transmission 13 is provided with an automatic transmission controller 27. The detection signal of the automatic transmission controller 27 is used for indicating the position of a transmission shift lever determined through gear-shifting operation and in the embodiment is also delivered to the controller 23.

Accordingly, the controller 23 subjects the control coupling 1 to energization control in accordance with an accelerator or throttle position, by means of the detection signal output from the accelerator switch 25. The controller 23 also determines inversion and non-inversion of the gear-shifting direction of the automatic transmission 13 in accordance with a signal-output from the automatic transmission controller 27 (e.g., a range signal which will be described later), thereby effecting energization control of the control coupling 1, as will be described later. The controller 23 determines occurrence of inversion when switching has arisen from a drive range signal D to a reverse range signal R or from the reverse range signal R to the drive range signal D. If such switching does not arise, the controller 23 determines that the gear-shifting remains non-inverted.

The control coupling 1 assumes a specific configuration such as that shown in FIG. 2. As shown in FIG. 2, the control coupling 1 has an inner rotary member 29 and an outer rotary member 31. The inner and outer rotary members 29, 31 are coaxially provided so to be able to rotate in relation to each other. Interposed between the inner and outer rotary members 29, 31 are a main clutch 33 serving as clutch means, a pilot clutch 35, and conversion means 37 constituted of a cam mechanism. Torque is transmitted between the inner and outer rotary members 29, 31 in accordance with energization control.

The inner rotary member 29 is constituted of an axial member and is coupled synchronously to a drive pinion shaft 39 (FIG. 1) serving as an input shaft of the rear differential 9. The outer rotary member 31 is constituted of a rotary case, and a coupling-shaft 41 connected integrally on an end section of the outer rotary member is synchronously joined to a constant-velocity joint 43 (FIG. 1) disposed on the drive shaft 7.

The main clutch 33 is constituted of a plurality of friction plates which engage the inner rotary member 29 and the outer rotary member 31 and are alternately disposed in the axial direction. The pilot clutch 35 is constituted of a plurality of friction plates which engage a cam plate 45 of the conversion means 37 and the outer rotary member 31 and are arranged alternately.

In addition to being formed from the cam plate 45, the conversion means 37 is constituted of a pressure plate 47 and steel balls 49 interposed between a cam surface of the cam plate 45 and a cam surface formed on the pressure plate 47.

The cam plate 45 is disposed so as to be rotatable in relation to an outer peripheral surface of the inner rotary member 29. One friction plate of the pilot clutch 35 is spline-engaged with an outer peripheral surface of the cam plate 45. An inner peripheral side of the pressure plate 47 is spline-engaged with the inner rotary member 29, and an outer peripheral side of the pressure plate 47 axially opposes the friction plate disposed at the end of the main clutch 33.

The pilot clutch 35 is fastened by means of an electromagnet 51 that attracts an armature 53. The electromagnet 51 is mounted on the outer rotary member 31 and supported by an end plate member 54 interposed between the inner and outer rotary members 29, 31. The electromagnet 51 is connected to the controller 23 by way of a lead wire 55.

Accordingly, when the electromagnet 51 is subjected to energization control performed by the controller 23, the armature 53 is attracted by means of electromagnetic force of the electromagnet 51, whereupon the pilot clutch 35 is engaged. When driving force is transmitted from the outer rotary member 31 at this time, relative rotation arises between the inner and outer rotary members 29, 31. As a result, the cam plate 45, which attempts to rotate in conjunction with the outer rotary member 31, and the pressure plate 47, which attempts to rotate in conjunction with the inner rotary member 29, rotate relatively to each other by way of the pilot clutch 35. As a result, the pressure plate 47 is moved toward the main clutch 33 by means of the cam action developing between the steel balls 49 and the cam surface. In association with movement of the pressure plate 47, the main clutch 33 is engaged, whereby torque can be transmitted from the outer rotary member 31 to the inner rotary member 29 by way of the main clutch 33.

Transmission of torque performed by the main clutch 33 can be arbitrarily controlled by means of energization control of the electromagnet 51 performed by the controller 23. Specifically, transmission of torque performed by the main clutch 33 enables energization control corresponding to the accelerator or throttle position.

FIG. 3 corresponds to FIG. 14. FIG. 3A is a graph showing a change in an accelerator or throttle position; FIG. 3B is a graph showing a change in the A/T range; and FIG. 3C is a graph showing a change in target torque (i.e., the value of a control current). A control current serves as implementation means when transmission torque of the control coupling 1 has achieved a target.

FIG. 3 shows a situation in which the vehicle is taking corners under the stipulation that a tight corner braking phenomenon will arise and in which, for example, the gear-shifting position of the automatic transmission 13 is switched from the drive range D to the reverse range R by means of performing tip-out and tip-in operations during the course of turns being taken, thereby reversing the gear-shifting direction.

In FIG. 3, the accelerator or throttle position is set to an arbitrary closed (OFF) position by means of performing a tip-out operation at a point in time (1) before switching is made to the A/T range at a point in time (3). After switching has been made to the A/T range, the accelerator or throttle position is set to an arbitrary open (ON) position by means of performing a tip-in operation at a point in time (2). The friction factor $\mu$ existing between the road surface and the tires corresponds to, e.g., a dry state.

The target torque of the control coupling 1 is controlled in a manner shown in FIG. 3C in accordance with the accelerator or throttle position shown in FIG. 3A and a change in the A/T range shown in FIG. 3B.

In FIG. 3, the gear-shifting direction is inverted at a point in time (3) during the course of the accelerator or throttle position being switched again to an open (ON) position by means of the tip-in operation performed at a point in time (2) after having once been switched to the arbitrary closed (OFF) position from the arbitrary open (ON) position by means of the tip-out operation at the point in time (1). When the accelerator or throttle position is switched from the ON position to the OFF position at the point in time (1), the controller 23 (see FIG. 1) performs energization control operation by means of a change represented by a line segment F3, in accordance with a signal output from the accelerator pedal position sensor 25 (see FIG. 1) until an inversion signal arises at the point in time (3).

The line segment F3 decreases the transmission torque of the main clutch 33, and controls energization such that the proportion of decrease in transmission torque is made steep at the beginning and then made gentle. The line segment F3 takes the proportion of decrease in transmission torque as being equivalent to a time constant. Hence, the embodiment adopts a multistage broken line. Alternatively, a curve can be made similar to a time-constant waveform by making control operation more elaborate.

Energization control is performed by means of such a line segment F3. In comparison with the control operation whose entirety assumes a steep slope which is described by reference to FIG. 14 and is based on the line segment F2, vibration of the control coupling 1 is dampened, thereby enabling shortening of a time required to decrease torque. As a result, physical shock such as swaying of the vehicle body can be inhibited without fail. Moreover, by virtue of the line segment F3 being made equivalent to the time constant, an amplitude can be made smaller in terms of vibration response. Hence, physical shock, such as swaying motion of the vehicle body, can be made smaller in a more reliable manner.

At the point in time (3) located between the point in time (1) for the tip-out operation and the point in time (2) for the tip-in operation, the controller 23 determines occurrence of inversion of the gear-shifting direction from the signal output from the automatic transmission controller 27 (see FIG. 1). Energization control of the electromagnet 51 is performed such that transmission torque of the main clutch 33 is decreased to a target value in accordance with the inversion signal.

The target value is intended for use in bringing target torque to, e.g., 0 Nm. Energization control is performed in accordance with a line segment F4 having a steep slope until target torque 0 Nm is achieved. The energization control is maintained from the time when control of transmission torque to 0 Nm starts until the time when time "t" (sec.) lapses. Here, the constant time "t" (sec.) is set as a response time during which actual transmission torque of the control coupling 1 becomes close to the target torque (0 Nm), by means of energization control of the electromagnet 51 in accordance with the line segment F4. Accordingly, even when energization control is performed such that the control coupling 1 assumes target torque by means of the tip-in operation performed at the point in time (2) after the gear-shifting direction has been inverted at the point in time (3), the control coupling 1 can bring the transmission torque to 0 Nm without fail before the transmission torque attains a target torque of a lock mode.

Even when the direction of torsion of the drive system attributable to the tight corner braking phenomenon has been changed by means of inversion of the gear-shifting direction, the direction of generated driving force can be changed with the transmission torque of the control coupling 1 being held at 0 Nm, thereby enabling smooth transition of the transmission torque to the target torque. Accordingly, since the torque (force) produced at the time of elimination of backlash is made small by means of a change in the direction—in which backlash is eliminated—due to a change in the direction of torsion of the drive shaft along the axis of the control coupling 1, the backlash is eliminated comparatively gradually, thereby considerably reducing or avoiding occurrence of impact sound due to elimination of backlash. Therefore, unusual sound or physical shock, which would otherwise grate on the occupants' ears, can be inhibited without fail.

In this case, subjecting the area of the line segment F3 to energization control at a slope like a line segment F4 results in occurrence of great physical shock, such as that induced conventionally. Hence, countermeasures must be taken before and after inversion of the gear-shifting direction arising at the point in time (3). In the embodiment, an appropriate one is selected from the line segments F3 and F4 according to a purpose, by means of detecting inversion of the gear-shifting direction arising at the point in time (3). Occurrence of physical shock and that of unusual sound can be inhibited simultaneously without fail.

FIG. 4 corresponds to FIG. 15, wherein FIG. 4A is a graph showing a change in an accelerator or throttle position; FIG. 4B is a graph showing a change in the A/T range; and FIG. 4C is a graph showing a change in target torque (i.e., the value of a control current).

FIG. 4 shows that the four-wheel drive vehicle comes to a halt while taking corners for reasons of a tight corner braking phenomenon and that the gear-shifting direction is inverted during the course of the tight corner braking phenomenon. Here, the friction factor $\mu$ existing between the tires and the road surface is presumed to be high.

Depending on a vehicle, when the value of the accelerator or throttle position is below a predetermined value, the vehicle often comes to a halt because of the tight corner braking phenomenon. Therefore, if in this state the A/T range is switched from the drive range D to the reverse range R at a point in time (4) as shown in FIG. 4B, to thereby reverse the gear-shifting direction, an inversion signal is detected at the point in time (4) in the same manner as mentioned previously. The controller 23 subjects the electromagnet 51 to energization control along the line segment F4 having a steep slope, in accordance with the inversion signal. The energization control is maintained for a given period of time "t" (sec.) from the point in time (4). Subsequently, the electromagnet 51 is subjected to energization control such that the control coupling 1 assumes a target torque. As a result, the transmission torque of the control coupling 1 decreases to a target value; e.g., 0 Nm.

The target control current value is maintained for a given period of time at "t" (sec.). As mentioned above, there can be ensured a time from the time when the electromagnet 51 is subjected to energization control until the time when the transmission torque of the control coupling 1 actually decreases to the target value. Accordingly, as in a case shown in FIG. 3 where the line segment F4 and the time "t" (sec.) are ensured, in the embodiment shown in FIG. 4 there can be reliably prevented occurrence of unusual sound or physical shock, which would otherwise grate on the occupants' ears for reasons of a change in the direction in which backlash is eliminated.

Inversion of the gear-shifting direction is not limited to a change from the drive range D to the reverse range R as mentioned above; the same also applies to a case where the gear-shifting direction is switched from the reverse range R to the drive range D.

FIG. 5 shows elements to be used for determining occurrence of inversion of the gear-shifting direction. FIG. 5A is a table showing signals used for ascertaining an A/T range; FIG. 5B is a table showing perception of direction of the A/T range; and FIG. 5C is a table for showing perception of inversion of the A/T range.

As shown in FIG. 5A, the parking range P, the reverse range R, the neutral range N, and the drive range D are used for perception of the A/T range, and the automatic transmission controller 27 detects the A/T range. As shown in FIG. 5B, binary number 0 is assigned to the reverse range R, and binary number 1 is assigned to the drive range D. Binary numbers 1, 0 are not fixedly assigned to a parking range P and a neutral range N; when the parking range P or the neutral range N comes into effect, the binary number assigned to the previous range is retained as is. For instance, when switching is made from the reverse range R to the neutral range N, the binary number assumes 0. In contrast, when switching is made from the drive range D to the neutral range N, the binary number assumes 1.

By means of an exclusive OR result determined from the binary number 1 or 0 assigned to the previous range perceived by switching of the A/T range and from the binary number 1 or 0 assigned to the current range, inversion of the gear-shifting direction is perceived. Specifically, if the previous range assumes binary number 0 and the current range assumes binary number 0, or if the previous range assumes binary number 1 and the current range also assumes binary number 1, 0 is perceived as shown in FIG. 5C, and therefore no inversion of the gear-shifting direction is perceived. In contrast, when the previous range assumes binary number 1 and the current range assumes binary number 0, or if the previous range assumes binary number 0 and the current range assumes binary number 1, occurrence of inversion of the gear-shifting direction is perceived.

FIG. 6 is a table showing operation settings employed when a determination is made as to whether or not the A/T range is inverted. FIG. 6 shows setting of target torque on the basis of determination of inversion of a range in a 4WD mode, a time during which the target torque is maintained, limitations on reduction of the target torque, and limitations on increase in the target torque. In this case, the target torque represents a constant related to a target control value; that is, a control current value, to be employed for bringing the control coupling 1 to the target torque.

As described by reference to FIGS. 3 and 4, when inversion of the range is determined to have been performed, target toque T (to be converted to a constant) is set. Concurrently, the time "t" during which the target torque is to be maintained (to be converted to a constant) and a limitation L on reduction of the target torque (to be converted to a constant) are set. As a result, the line segments F3, F4 shown in FIGS. 3 and 4 are determined.

Even when inversion of the range is determined not to have been performed, L1, L2, and L3 (all to be converted to constants) are set as limitations on reduction of the target toque. The line segment F3 shown in FIG. 3 is set.

Figures 7A, 7B:
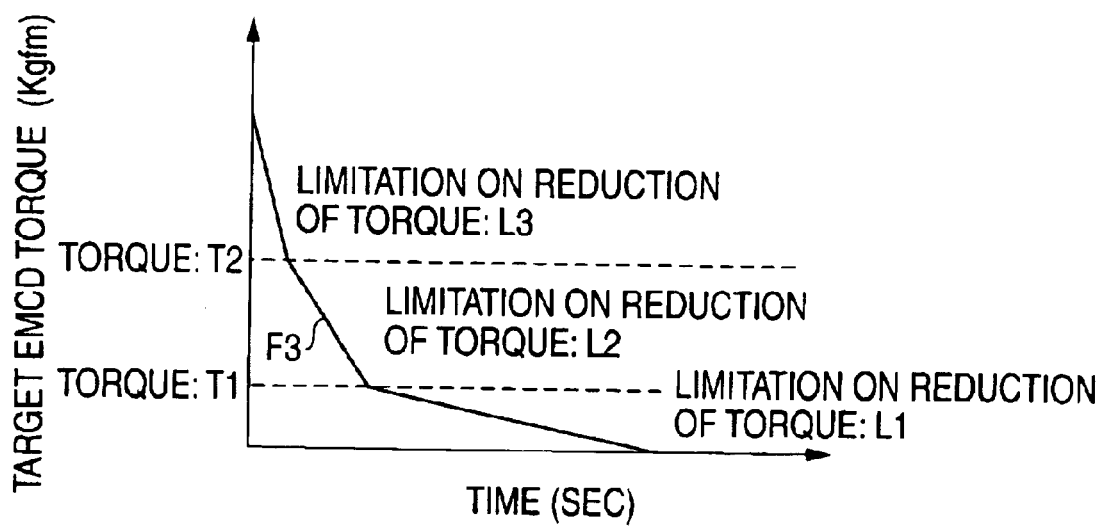
FIG. 7A is a table showing limitations on reduction of target torque.
FIG. 7B is a graph showing an operation image of limitation on reduction of the target torque.

FIG. 7 describes settings of the line segment F3 shown in FIG. 3. FIG. 7A is a table showing the constants L1, L2, and L3 to be used for limiting the reduction of the target torque at respective stages, and FIG. 7B is a graph showing the line segment F3.

As shown in FIGS. 7A and 7B, the period from the point in time (1) (see FIG. 3) for tip-out to the point in time (3) (see FIG. 3) where an inversion signal arises is divided into three stages; that is, a first stage in which the target torque exceeds T2; a second stage in which the target torque exceeds T1 and goes below T2; and a third stage in which the target torque goes below T1. In each of the stages, the constants L1, L2, and L3 are set. As a result, control represented by the line segment F3 as shown in FIG. 7B can be performed.

Figure 8:
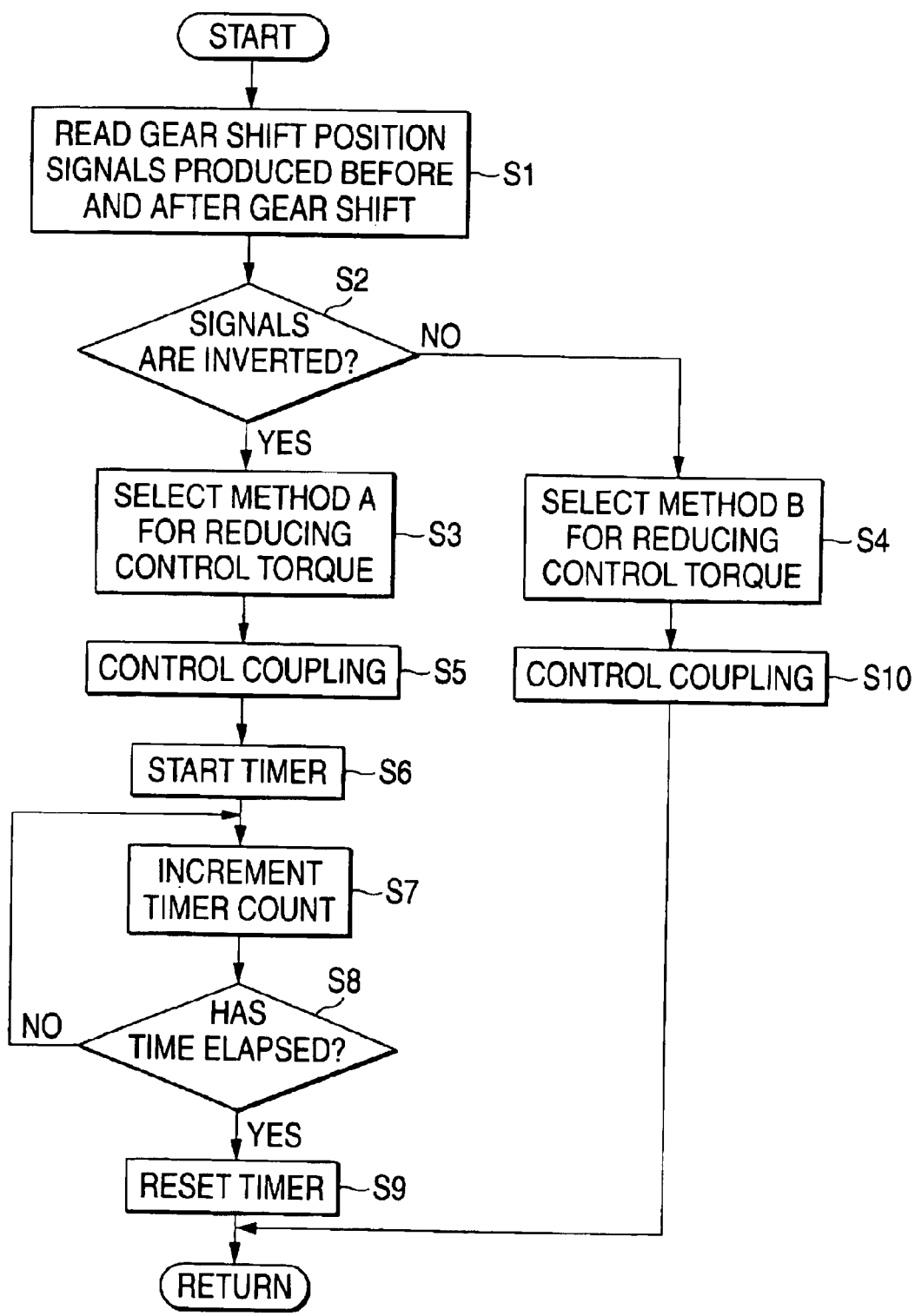
FIG. 8 is a flowchart relating to the embodiment.

FIG. 8 is a flowchart showing control operations to be performed depending on whether or not the gear-shifting direction is inverted. When processing pertaining to the flowchart shown in FIG. 8 is performed, processing "reading of gear shift position signals produced before and after occurrence of a shift" is executed in step S1. Through the processing, binary numbers 0, 1 issued before and after occurrence of a shift in transmission in the respective ranges shown in FIG. 5 are read, whereupon processing proceeds to step S2.

In step S2, a determination is made as to whether or not inversion has been performed, by means of an exclusive OR result shown in FIG. 5C. When inversion is determined to have been performed, processing proceeds to step S3. In contrast, when inversion is determined not to have been performed, processing proceeds to step S4.

In step S3, processing "selection of a method A for reducing control torque" is performed. Through the processing, the line segment F4 shown in FIGS. 3 and 4 is selected by means of setting of the constants; that is, the target toque T, the retention time "t," and the reduction limitation L. Then, processing proceeds to step S5.

In step S5, the electromagnet 51 (see FIG. 2) of the control coupling 1 (see FIG. 1) is subjected to energization control along the line segment F4 set by the constants T, "t," and L, and processing proceeds to step S6.

In step S6, processing "timer start" is performed, whereby the timer is set by the controller 23 (see FIG. 1). Processing then proceeds to step S7. The time set in step S6 is a constant time "t" (sec.).

In step S7, processing "timer count-up" is performed, whereby a timer performs count-up operation in increments of preset time. Then, processing proceeds to step S8.

In step S8, a determination is made as to whether or not a time has elapsed. This determination is intended to be made as to whether or not the constant time "t" (sec.) has elapsed. If the time has not yet elapsed (when NO is selected), processing returns to step S7. If the time has elapsed (when YES is selected), processing proceeds to step S9. Therefore, if the constant time "t" (sec.) has not elapsed, a count-up operation is performed in step S7 during the course of lapse of the constant time. Energization control of the electromagnet 51 along the line segment F4 is continuously performed. If the constant time "t" (sec.) has elapsed, processing "timer clear" is performed in step S9. The timer is reset, and processing is again iterated from step S1.

In step S4, processing "selection of a method B for reducing control torque" is performed. Through the processing, the line segment F3 shown in FIG. 3 is selected by means of setting of the constants T1, T2, L1, L2, and L3. Processing then proceeds to step S10.

In step S10, processing "coupling control" is performed, and the electromagnet 51 of the control coupling 1 is subjected to energization control according to the line segment F3. As a result, a reduction in control torque is performed in preference to operability, thereby inhibiting occurrence of physical shock and unusual noise.

The embodiment has described a case where the transmission is an automatic transmission. The same also applies to a manual transmission.

FIG. 9 corresponds to FIG. 5 and relates to a method for determining whether or not the gear-shifting direction is inverted by the manual transmission. FIG. 9A is a table showing signals employed for perceiving a shift position of the manual transmission (i.e., an M/T range); FIG. 9B is a table showing perception of a direction of the M/T range; and FIG. 9C is a table showing perception of inversion of the M/T range.

As shown in FIG. 9A, detection signals pertaining to the neutral range N, the reverse range R, the first range, the second range, and the third range are used for perception of the M/T range. Detection of ranges is performed by means of shift switches or the like provided for respective ranges around the shift lever.

As shown in FIG. 9B, numeral 1 is fixedly assigned to the reverse range R; and numeral 0 is fixedly assigned to forward directions $1^{st}$ to X such as the first range, the second range, the third range, etc. No fixed value is assigned to the neutral range N, and a value identical with that employed for the previous range is maintained. If the previous range is the reverse range R, the neutral range N assumes a value of 1.

If the previous range is any one of $1^{st}$ to X, such as the first range, the second range, the third range, etc., the neutral range assumes a value of 0. As a result, as in the case of FIG. 5, when the exclusive OR result assumes a value of 0, no inversion can be determined to have been performed in the manner as shown in FIG. 9C. When the exclusive OR result assumes a value of 1, inversion can be determined to have been performed.

Accordingly, the electromagnet 51 is subjected to energization control in the same manner through use of perception of inversion. Occurrence of physical shock or unusual noise can be inhibited accurately.

The front-engine, front-drive (FF) four-wheel drive vehicle has been described in the embodiment. However, the invention can also be applied in the same manner to a front-engine, rear-drive (FR) four-wheel drive vehicle such as that shown in FIGS. 10 and 11. Constituent elements corresponding to those shown in FIG. 1 are assigned corresponding reference numerals and will be described.

Figure 10:
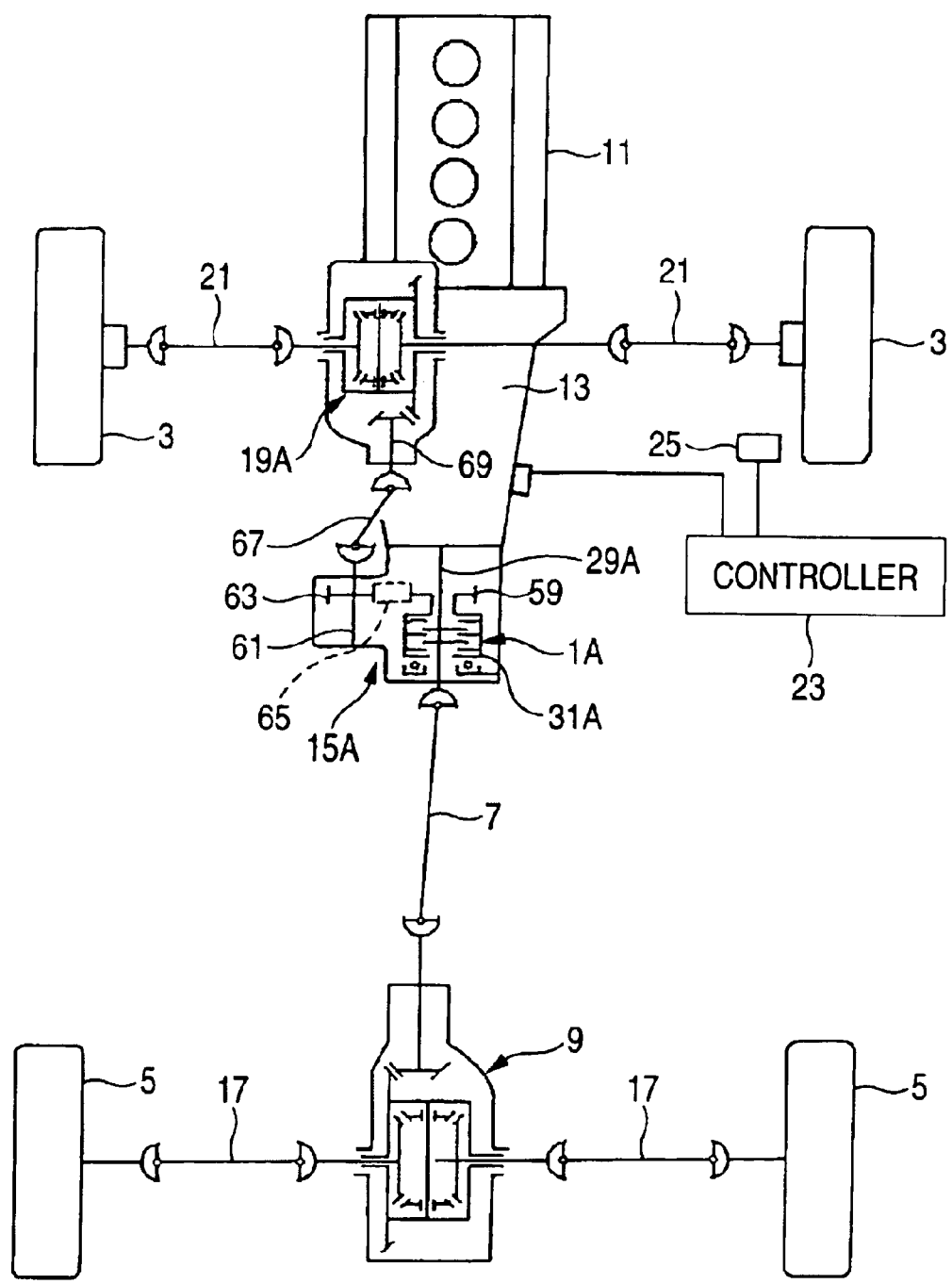
FIG. 10 is a skeleton diagram showing an embodiment in which a control coupling is provided in a transfer section of an FR-based four-wheel drive vehicle.

In FIG. 10, a control coupling 1A is provided within a transfer 15A disposed at an output-side of the automatic transmission 13. An inner rotary member 29A of the control coupling 1A is coupled to the output-side of the automatic transmission 13 and further joined to the drive shaft 7. An outer rotary member 31A of the control coupling 1A is provided with a gear 59. An interlocking belt 65 is passed between the gear 59 and a gear 63 provided on an output shaft 61 of the transfer 15A. The output shaft 61 is coupled to an input shaft 69 of a front differential 19A by way of a shaft 67.

Accordingly, driving force is transmitted from the engine 11 to the rear wheels 5 by way of the automatic transmission 13, the inner rotary member 29A of the control coupling 1A, the drive shaft 7, the rear differential 9, and the axle shaft 17. In the meantime, the driving force can also be transmitted to the front wheels 3 from the inner rotary member 29A of the control coupling 1A by way of the control coupling 1A, the gear 59, the interlocking belt 65, the gear 63, the output shaft 61, the shaft 67, the input shaft 69, the front differential 19A, and the axle shaft 21.

Accordingly, a 4WD mode is controlled by means of energization control analogous to that to which the control coupling 1A is to be subjected, thereby accurately avoiding occurrence of physical shock and unusual noise.

Figure 11:
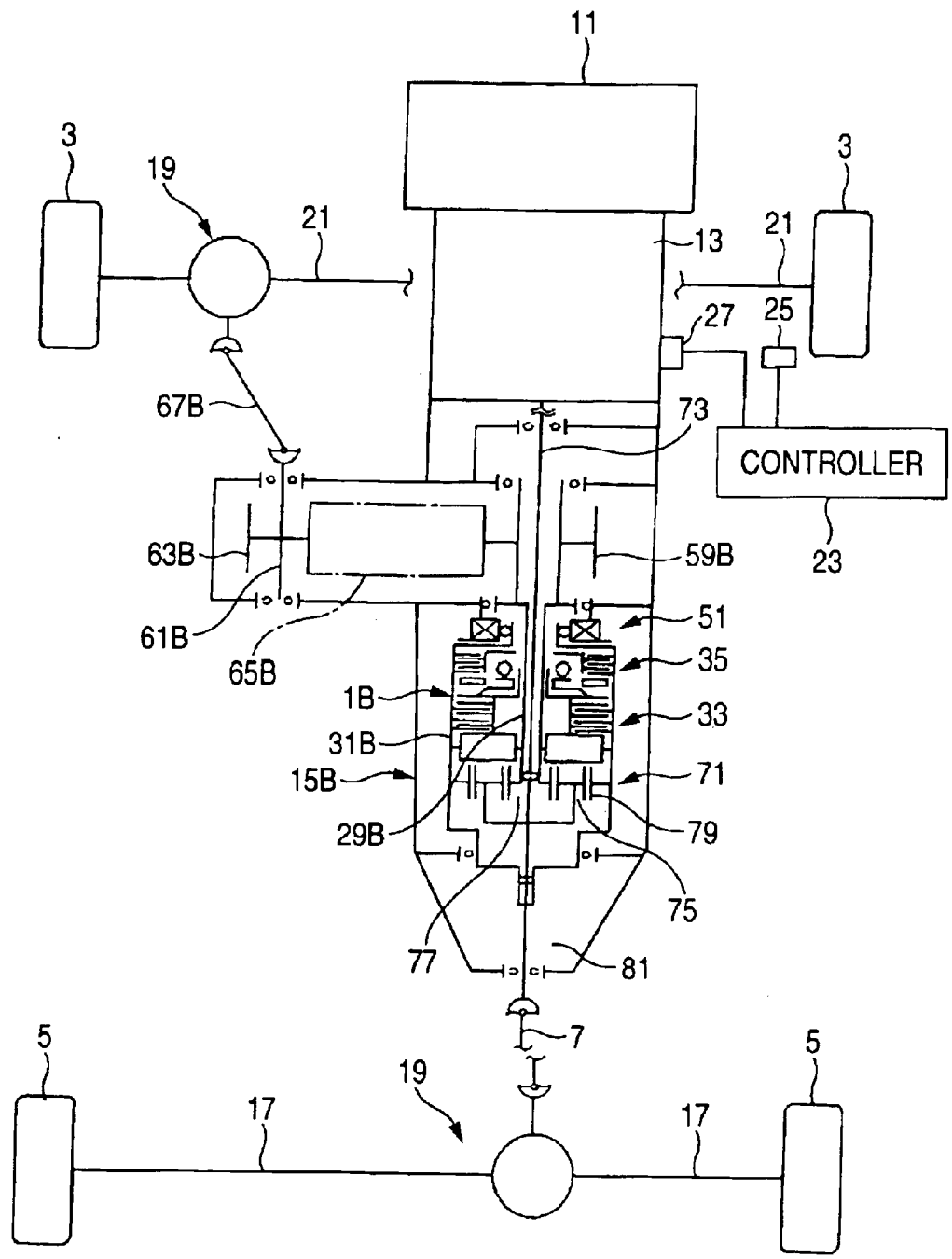
FIG. 11 is a skeleton diagram showing an embodiment in which a control coupling is provided as a differential limiter for a center differential of a planetary differential gear mechanism of the FR-based four-wheel drive vehicle.
Figure 12:
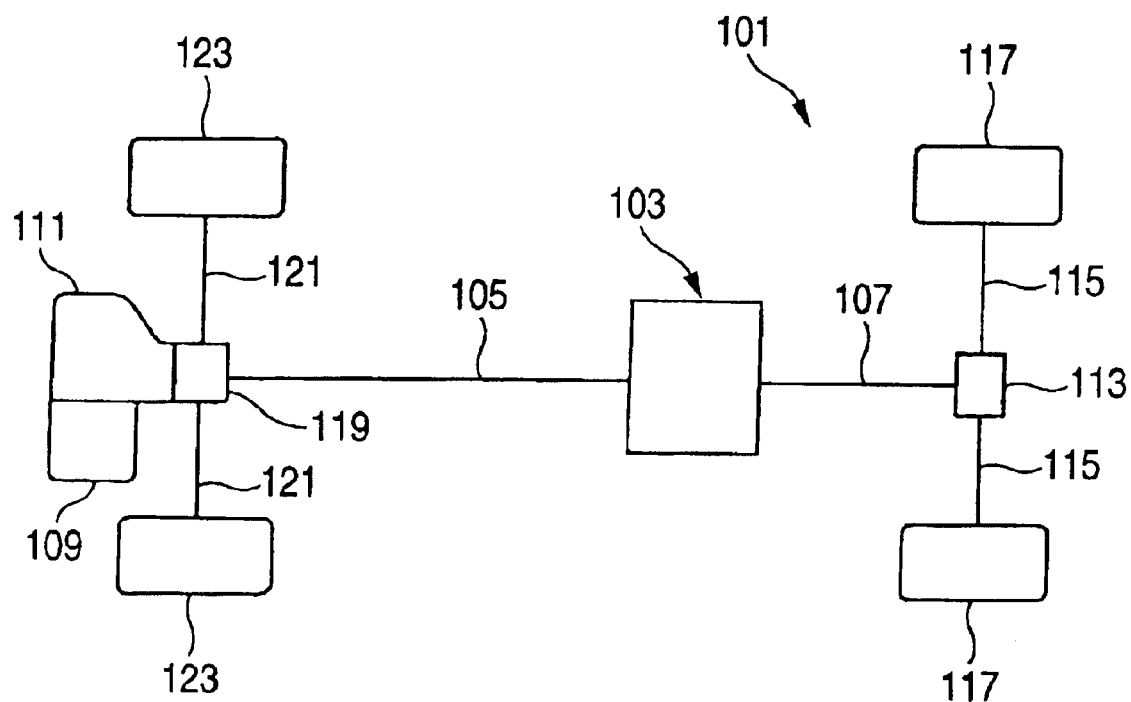
FIG. 12 is a skeleton diagram of a related-art four-wheel drive vehicle.
Figure 13:
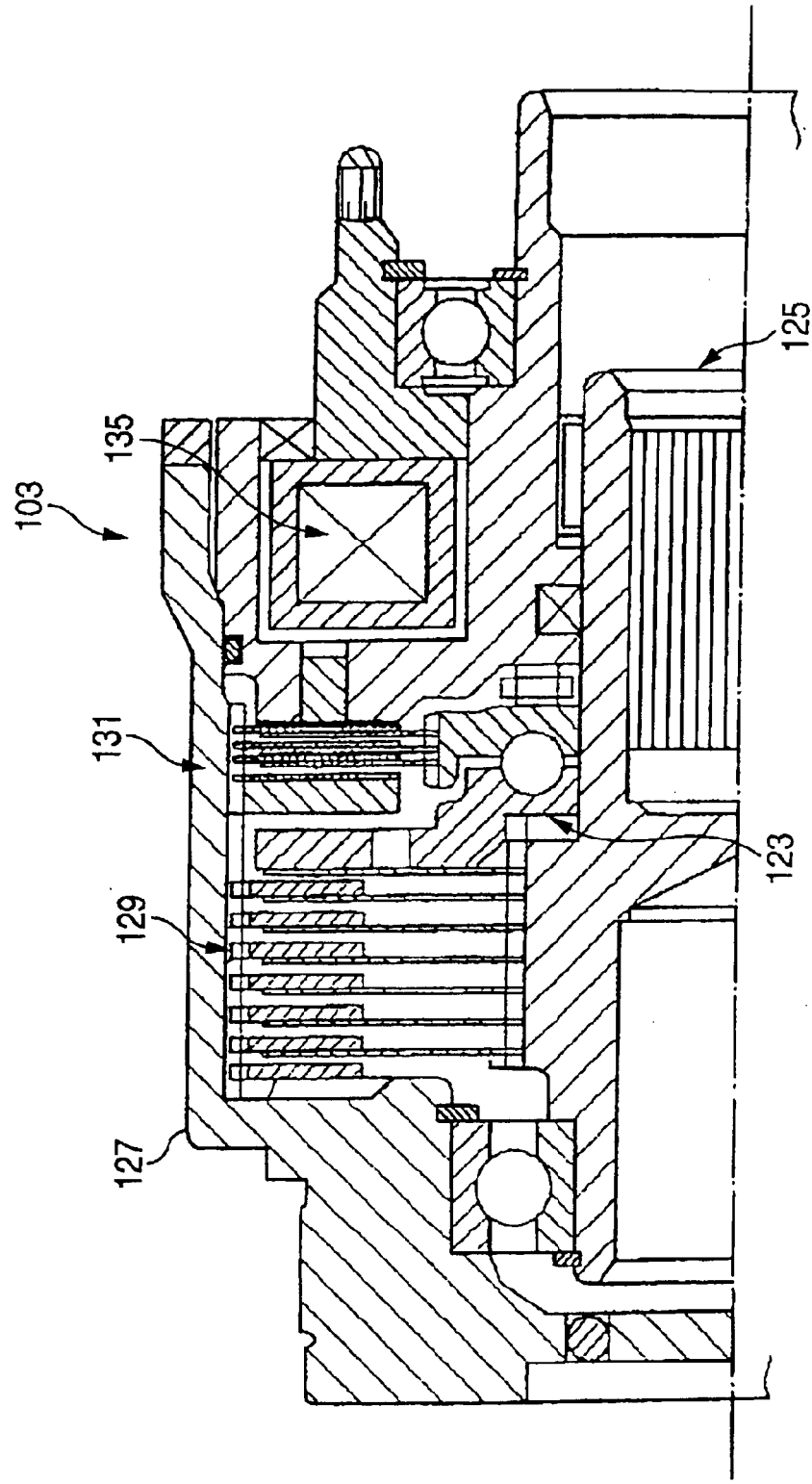
FIG. 13 is a semi-cross-sectional view of a related-art control coupling.

FIG. 11 shows a front-engine, rear-drive (FR) four-wheel drive vehicle to which the invention is applied. The control coupling 1, which performs direct transmission of driving force, is not subjected to energization control in the manner mentioned above. The main clutch 33, the pilot clutch 35, the electromagnet 51, or the like are provided so as to limit differential operation of a center differential 71 by means of a planetary differential gear mechanism of a transfer 15B. Specifically, a planetary gear 75 of the center differential 71 is supported by a shaft 73 coupled to the output-side of the automatic transmission 13. An inner rotary member 29B of a control coupling 1B is coupled to a sun gear 77 of the center differential 71.

A gear 59B is coupled to the inner rotary member 29B, and an interlocking belt 65B is passed between the gear 59B and a gear 63B of an output shaft 61B of the transfer 15B. The output shaft 61B is coupled to an input-side of the front differential 19 by way of a shaft 67B.

An outer rotary member 31B of the control coupling 1B is provided integrally on a link gear 79 of the center differential 71 and further coupled to the drive shaft 7 by way of an output shaft 81 of the transfer 15B.

In the embodiment shown in FIG. 11, the driving force output from the engine 11 by way of the automatic transmission 13 is transmitted to the front differential 19 from the sun gear 77 by way of the inner rotary member 29B, the gear 59B, the interlocking belt 65B, the gear 63B, the output shaft 61B, and the shaft 67B, as a result of the sun gear 77 and the ring gear 79 being rotated together by means of revolution of the planetary gear 75 of the center differential 71 from the shaft 73. The driving force is also transmitted to the rear differential 9 from the ring gear 79 of the center differential 71 by way of the outer rotary member 31B, the output shaft 81, and the drive shaft 7.

If a difference arises between the rotational speed of the front wheels 3 and that of the rear wheels 5 because of turning of corners during the course of transmission of driving force, the planetary gear 75 rotates in accordance with a difference in rotations of the inner rotary member 29B and those of the outer rotary member 31B, and the center differential 71 absorbs the difference in rotation.

In accordance with high-speed travel, low-speed travel, cornering, travel over a poor road, etc., the electromagnet 51 is subjected to energization control, thereby controlling the engagement force of the pilot clutch 35 and controlling the transmission torque of the control coupling 1.

Through control of the transmission torque of the control coupling 1, relative rotation existing between the inner rotary member 29B and the outer rotary member 31B is controlled from a totally free state to a locked state, thereby enabling control of differential rotation of the center differential 71.

Even in such a structure, the physical shock developing in the control coupling 1 is dampened by means of similar control operation, thereby inhibiting occurrence of unusual noise.

The foregoing embodiment shows that a processing signal and a range signal produced by an automatic transmission controller are used as inversion detection means for detecting inversion and non-inversion of the gear-shifting direction of the transmission. A signal output directly from an inhibitor switch provided in the automatic transmission controller can also be used as another detection means. Moreover, a signal output directly from the inhibitor switch can also be used as detection means separate from the automatic transmission controller.

Here, the inhibitor switch is specifically illustrated. A contact signal of the inhibitor switch is utilized as detection means. In accordance with a combination of connection and non-connection states of a plurality of contact signals, a determination can be made as to whether inversion or non-inversion has arisen.

Further, the automatic transmission can use a signal pertaining to the position of a shift lever or a rotation angle signal of a gear-shifting rotary drum as detection means, regardless of a signal pertaining to the position of a manual valve, the automatic transmission, and the manual transmission.

The invention is not limited to the form of the transmission or specific detection means. Various transmissions or various detection means (i.e., a detection signal etc.) are selected as required within the scope of the invention and can be adopted in combination.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

In the embodiment, control is performed in accordance with detection of inversion of the transmission. However, clutch means can be controlled in accordance with the state of gear shift of the transmission, to thereby appropriately control the driving force to be transmitted from the engine to the vehicle, by means of providing a vehicle with a gear shift status detection means for detecting the state of gear shift of the transmission and control means for subjecting the electromagnet to energization control such that the transmission torque of the clutch means is controlled to a target value in accordance with a gear shift status signal detected by the gear shift status detection means. Such a configuration, among others, can also yield the same effect as that yielded by the embodiment. Moreover, an electromagnet can be subjected to energization control such that transmission torque shifts to a target value, in accordance with signals pertaining to respective states of gear shift employed as substitutes for a gear position of the manual transmission or a gear position of the automatic transmission. As a result, the transmission torque can be controlled immediately under various situations; for example, where high drive torque is required while a vehicle remains in a low-speed state; where transmission torque higher than required is not needed for the vehicle to cruise at high speed; and where supply of transmission torque to four wheels is not required when the gear is shifted to a low-speed range (to prevent occurrence of interference with an ABS), by means of increasing or decreasing the transmission torque required to achieve driving stability according to the gear position when the vehicle is taking corners.

What is claimed is:

1. A power transfer apparatus of a four-wheel drive vehicle, comprising:
   a clutch that distributes a torque, that is generated by an engine via a transmission, between a primary wheel and a secondary wheel;
   inversion detection means for detecting inversion or non-inversion of a gear-shifting direction of the transmission; and
   control means for effecting a control operation such that torque to be transmitted by the clutch is decreased to a target value in accordance with an inversion signal pertaining to said gear-shifting direction detected by said inversion detection means.

2. The power transfer apparatus according to claim 1, wherein said control means performs the control operation by setting a target control value corresponding to said target value of said torque to be transmitted, thereby maintaining said target control value for a period of time.

3. The power transfer apparatus according to claim 2, further comprising:
   accelerator or throttle position detection means for detecting whether an accelerator or throttle position is in an arbitrary open position or an arbitrary closed position,
   wherein, when the inversion signal detected by said inversion detection means arises during the course of the accelerator or throttle position detected by said accelerator or throttle position detection means shifting again to an open position after having shifted from an arbitrary open position to an arbitrary closed position, said control means sets said period of time on the basis of the inversion signal before the accelerator or throttle position again shifts to the open position.

4. The power transfer apparatus according to claim 3, wherein, when the inversion signal detected by said inversion detection means arises during the course of the accelerator or throttle position detected by said accelerator or throttle position detection means shifting again to an open position after having shifted from an arbitrary open position to an arbitrary closed position and when shifting of the accelerator or throttle position from an arbitrary open position to an arbitrary closed position has been detected, said control means performs control operation for reducing the torque to be transmitted by the clutch means and making a decrease rate steep at the beginning and then gentle before the inversion signal detected by said inversion detection means arises.

5. The power transfer apparatus according to claim 4, wherein said control means controls the decrease rate of the torque to be transmitted, in accordance with a time constant.

6. The power transfer apparatus according to claim 1, wherein said clutch comprises:
   a main clutch which is interposed between inner and outer rotary members, which enables transmission of torque by generating frictional engagement force when said inner and outer rotary members rotate in relation to each other, and which increases or decreases said frictional engagement force in accordance with axial pressing force;
   a pilot clutch which performs frictional engagement by means of electromagnetic force generated through said energization control; and
   conversion means which operates by means of frictional engagement of said pilot clutch, which converts force derived from frictional engagement of said pilot clutch, and which imparts pressing force to said main clutch.

7. The power transfer apparatus according to claim 1, wherein a driving force is transmitted in accordance with an engagement force of the clutch while the engagement force of the clutch is controlled.

8. The power transfer apparatus according to claim 1, wherein a driving force is transmitted while a differential motion of a differential disposed between the primary wheel and the secondary wheel is limited by controlling an engagement force of the clutch.

9. A power transfer apparatus of a four-wheel drive vehicle, comprising:
   a clutch that distributes a torque, that is generated by an engine via a transmission, between a primary wheel and a secondary wheel;
   gear shift status detection means for detecting a state of gear shift of the transmission, wherein the state of gear shift of the transmission is a gear shifting inversion of the transmission; and
   control means for controlling the clutch in such a manner that the torque to be transmitted by the clutch attains a target value in accordance with a gear shift status signal detected by the gear shift status detection means.

10. The power transfer apparatus according to claim 9, wherein the torque is transmitted in accordance with an engagement force of the clutch while an engagement force of the clutch is controlled by an electromagnetic force derived from energization control.

11. The power transfer apparatus according to claim 9, wherein the torque is transmitted while a differential motion of a differential disposed between the primary wheel and the secondary wheel is limited by controlling an engagement force of the clutch that is controlled by an electromagnetic force-derived from energization control.

12. A power transfer apparatus of a four-wheel drive vehicle, comprising:

a clutch that distributes a torque, that is generated by an engine via a transmission, between a primary wheel to and a secondary wheel;

means for detecting a gear shifting condition of the transmission, wherein the near shifting condition is a gear shifting inversion of the transmission; and a controller that receives an input signal indicating the gear shifting condition and generates a control signal that reduces a torque transmitted by the clutch to a target value.

13. A device for controlling torque transmitted by a clutch, comprising:

a controller that generates a control signal based on an input received from a transmission, wherein said control signal is output to said clutch to decrease said torque to a target value, and wherein the input is indicative of an inversion in a gear-shifting direction of the transmission.

14. The device according to claim 13, wherein said controller sets a target control value corresponding to said target value of said torque to be transmitted, thereby maintaining said target control value for a period of time.

* * * * *

UNITED STATES PATENT AND TRADEMARK OFFICE
CERTIFICATE OF CORRECTION

PATENT NO. : 6,910,983 B2  Page 1 of 1
DATED : June 28, 2005
INVENTOR(S) : Masanari Wakamatsu It is certified that error appears in the above-identified patent and that said Letters Patent is hereby corrected as shown below:

Column 21,
Line 5, please change the word "near" to -- gear --.

Signed and Sealed this

First Day of November, 2005

JON W. DUDAS
*Director of the United States Patent and Trademark Office*